(12) United States Patent
Bigioi et al.

(10) Patent No.: US 12,142,010 B2
(45) Date of Patent: Nov. 12, 2024

(54) METHOD FOR CALIBRATING A VEHICLE CABIN CAMERA

(71) Applicant: FotoNation Limited, Galway (IE)

(72) Inventors: Petronel Bigioi, San Jose, CA (US); Piotr Stec, San Jose, CA (US)

(73) Assignee: FotoNation Limited (IE)

( * ) Notice: Subject to any disclaimer, the term of this patent is extended or adjusted under 35 U.S.C. 154(b) by 0 days.

(21) Appl. No.: 18/087,938

(22) Filed: Dec. 23, 2022

(65) Prior Publication Data

US 2023/0127692 A1    Apr. 27, 2023

Related U.S. Application Data

(63) Continuation of application No. 17/398,965, filed on Aug. 10, 2021, now Pat. No. 11,538,192.

(51) Int. Cl.
*G06T 7/80* (2017.01)
*B60R 1/12* (2006.01)
*B60R 11/00* (2006.01)
*B60R 11/04* (2006.01)
*G06T 7/13* (2017.01)

(52) U.S. Cl.
CPC .............. *G06T 7/80* (2017.01); *B60R 1/12* (2013.01); *B60R 11/04* (2013.01); *G06T 7/13* (2017.01); *B60R 2001/1253* (2013.01); *B60R 2011/0033* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 9,767,371 B2* | 9/2017 | Ai | G06F 13/16 |
| 10,224,174 B1* | 3/2019 | Freitag | H01J 37/26 |
| 2005/0212931 A1* | 9/2005 | Gallagher | H04N 23/6812 |
| | | | 348/E5.046 |
| 2009/0295921 A1* | 12/2009 | Fujita | B60R 1/23 |
| | | | 348/148 |
| 2020/0327356 A1* | 10/2020 | Raj | G06V 10/751 |
| 2021/0188205 A1* | 6/2021 | Adusumalli | G06V 10/25 |
| 2021/0366089 A1* | 11/2021 | Shen | G06V 10/25 |

* cited by examiner

*Primary Examiner* — Edemio Navas, Jr.
(74) *Attorney, Agent, or Firm* — Lerner David LLP

(57) ABSTRACT

A method for calibrating a vehicle cabin camera having: a pitch, yaw and roll angle; and a field of view capturing vehicle cabin features which are symmetric about a vehicle longitudinal axis comprises: selecting points from within an image of the vehicle cabin and projecting the points onto a 3D unit circle in accordance with a camera projection model. For each of one or more rotations of a set of candidate yaw and roll rotations, the method comprises: rotating the projected points with the rotation; flipping the rotated points about a pitch axis; counter-rotating the projected points with an inverse of the rotation; and mapping the counter-rotated points back into an image plane to provide a set of transformed points. A candidate rotation which provides a best match between the set of transformed points and the locations of the selected points in the image plane is selected.

16 Claims, 6 Drawing Sheets

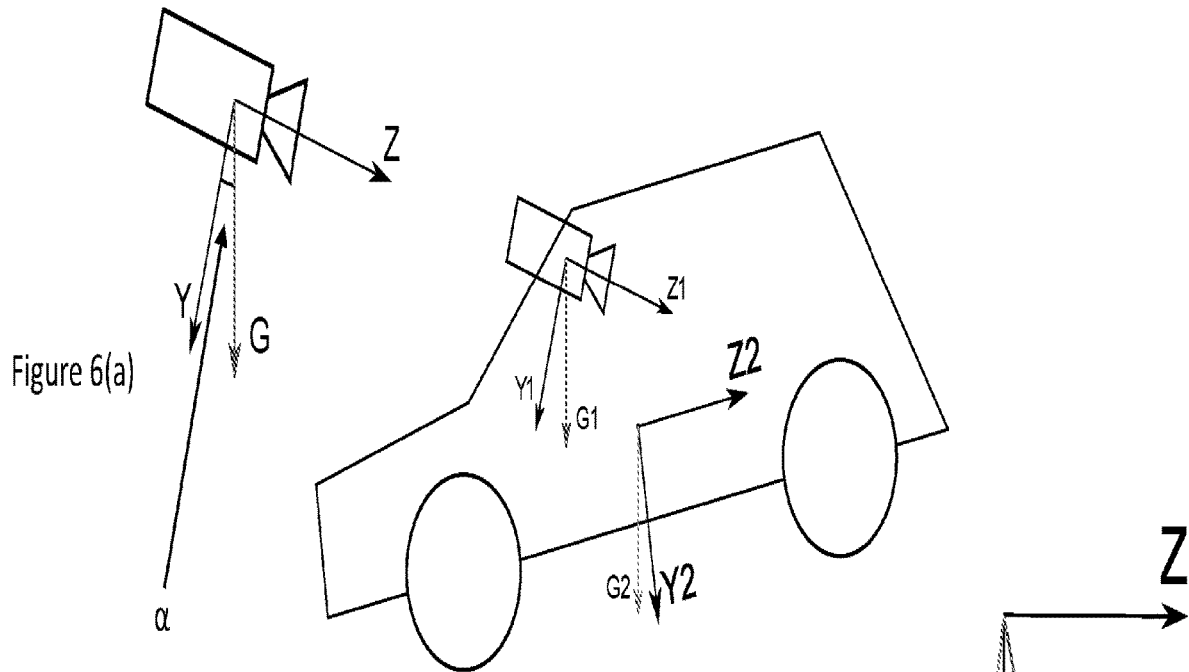
Figure 6(a)
Figure 6(b)
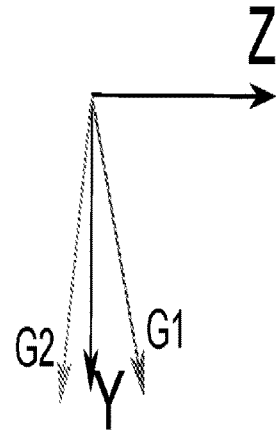
Figure 6(c)

METHOD FOR CALIBRATING A VEHICLE CABIN CAMERA

CROSS-REFERENCE TO RELATED APPLICATIONS

This application is a continuation, of U.S. application Ser. No. 17/398,965, filed on Aug. 10, 2021, the disclosure of which is incorporated herein by reference.

FIELD

The present invention relates to a method for calibrating a vehicle cabin camera.

BACKGROUND

One popular choice for the locating one or more cameras in a vehicle cabin is as part of a rear-view mirror assembly, which is typically mounted to an overhead console through a ball joint to allow the mirror along with the camera(s) to pivot with 3 degrees of freedom. Such cameras acquire respective streams of images which are provided to downstream processors running applications such as occupant monitoring systems or augmented reality applications.

Examples of such systems are disclosed in U.S. Pat. No. 10,948,986 (Ref: FN-641-US), PCT Application No. PCT/EP2021/063926 (Ref: FN-658-PCT) and U.S. application Ser. No. 17/364,749 filed on 30 Jun. 2021 entitled "Vehicle occupant monitoring system and method" (Ref: FN-676-US) the disclosures of which are herein incorporated by reference.

For such applications, knowing the actual camera orientation in the real world, in particular its rotation about x, y and z axes (pitch, yaw and roll) is useful. (Assuming the center of rotation of the ball joint does not move and knowing the spatial relationship between any camera location and the center of rotation of the ball joint, these angles can be used to locate the camera in 3-D space.) Note that while the term "mirror" is used above, this covers both real optical mirrors and electronic displays which simulate an optical mirror.

It will also be appreciated that once the orientation of any mirror camera is known, this can also be used for the orientation of the mirror and indeed any other mirror camera.

While it is possible to incorporate multiple sensors inside the mirror or the joint of the mirror to determine mirror camera orientation, these absorb power and typically involve providing additional supply and/or signal cables which are not desirable, especially for calibration which may only need to be performed infrequently.

A visual, extrinsic, method of calculating camera orientation would therefore be more desirable.

SUMMARY

According to the present invention, there is provided a method for calibrating a vehicle cabin camera according to claim 1.

Embodiments of the present invention provide a reliable solution for camera orientation by reducing the possible number of local minima/maxima which may be found during a search of candidate orientations.

In some cases, when a CAD model of the vehicle interior is known to the processor performing the calibration method, the method reduces the numerical complexity of camera orientation measurement by an order of magnitude compared to a CAD only approach.

In cases where the CAD model is not available to the processor performing the calibration method, the method can supplement a limited inertial measurement of camera orientation provided by, for example, a single accelerometer housed within the camera or mirror, and allow for orientation detection in all three degrees of freedom while inertial measurement alone gives only two degrees of freedom. Such an accelerometer-based method has a numerical complexity two orders of magnitude lower than a CAD only approach and one order of magnitude lower than methods combining CAD data and the assumption of at least partial vehicle symmetry.

In a further aspect, there is provided a computer program product comprising a computer readable medium on which instructions are stored which when executed on a processor of a vehicle system are configured to perform a method according to the invention.

BRIEF DESCRIPTION OF THE DRAWINGS

Embodiments of the invention will now be described, by way of example, with reference to the accompanying drawings, in which:

FIGS. 6(a)-6(c) show a camera local coordinate system with respect to gravity vector; a vehicle with a movable camera and the respective coordinate systems of the camera and vehicle; and a difference between the vectors measured by camera and vehicle accelerometers after coordinate systems alignment.

DESCRIPTION OF THE PREFERRED EMBODIMENTS

Figure 1:
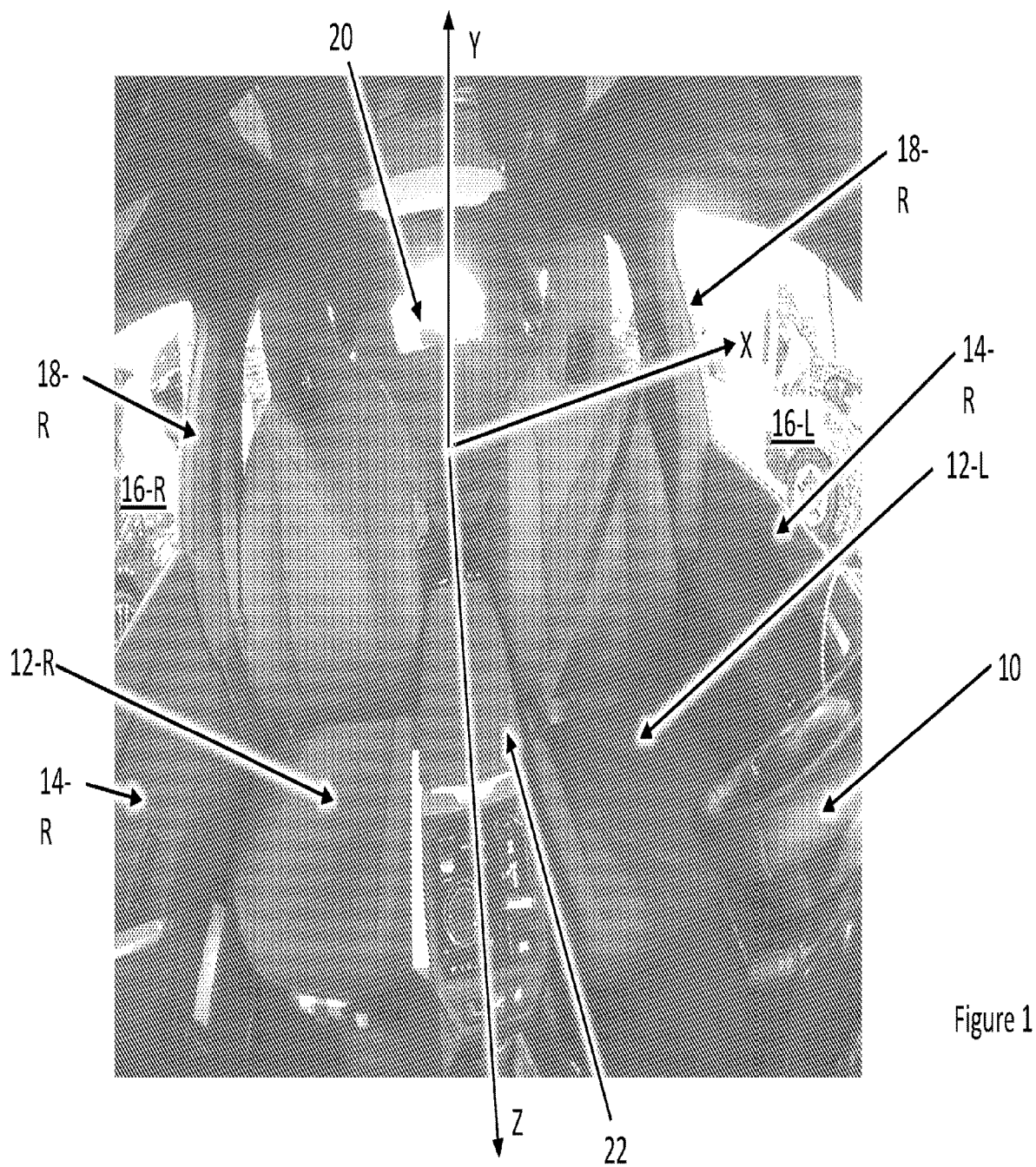
FIG. 1 is an image of a vehicle interior as seen from a camera mounted on a rear view mirror.

Referring to FIG. 1, for the purposes of the present description, a coordinate system is associated with a vehicle body where the X axis is horizontal and spans from left to right, the Y axis points upwards and the Z axis extends longitudinally from back to front of the vehicle.

In the illustrated example, the vehicle cabin interior shown is that of a car, however, it will be appreciated that the invention is applicable to any vehicle.

Embodiments of the present invention are based on the observation that although certain elements of a vehicle cabin interior are disposed towards one side or other of a cabin, for example, a steering wheel 10, and some elements of the cabin are adjustable and so may appear in different positions from time to time, for example, the steering wheel 10 and front seats 12-L, 12-R: there are at least some components or pairs of components of the cabin which are symmetrical about a vertical plane running longitudinally through the vehicle, for example, the left and right door frames 14-L, 14-R, left and right side window openings 16-L, 16-R, the B-pillars 18-L, 18-R, rear window 20 and at least some elements of the center console 22; the ball joint about which a rear view mirror pivots is mounted on or very close to this plane; and the one or more mirror cameras which are to be calibrated are located close to the center of the mirror so that they lie on or close to the plane. In the example, this plane intersects the illustrated Y-Z axes.

If the orientation of any mirror camera relative to this YZ plane can be determined, then two degrees of freedom of the camera's orientation can be calibrated: yaw, rotation around the Y axis; and roll, rotation around the Z axis.

On the other hand, a camera's rotation around the X axis, pitch, cannot be measured using knowledge of vehicle symmetry alone and is found using a different approach.

In the embodiment, the field of view of any camera should be sufficiently large that at least some of the symmetrical elements of the vehicle cabin interior, such as those mentioned above, are visible across the range of camera orientations. Also, the camera lens projection model must be known for each camera within the mirror which is to be calibrated. These cameras can comprise any of a visible wavelength RGB camera, a Bayer array type camera with sensitive RGB-IR or RGB-W pixels, a dedicated IR camera, a bolometer, an event camera of the type disclosed in PCT Application No. PCT/EP2021/066440 (Ref: FN-668-PCT) the disclosure of which is herein incorporated by reference, or a combined frame based and event camera such as a Davis 346 camera available at iniVation.com. In the case of an event sensor, a technique such as disclosed in PCT Application WO2021/089216 (Ref: FN-654-PCT), the disclosure of which is herein incorporated by reference may be required to generate an image of the symmetric elements of the vehicle cabin interior which tend to be static and which can be used for the calibration method described below.

Figure 2:
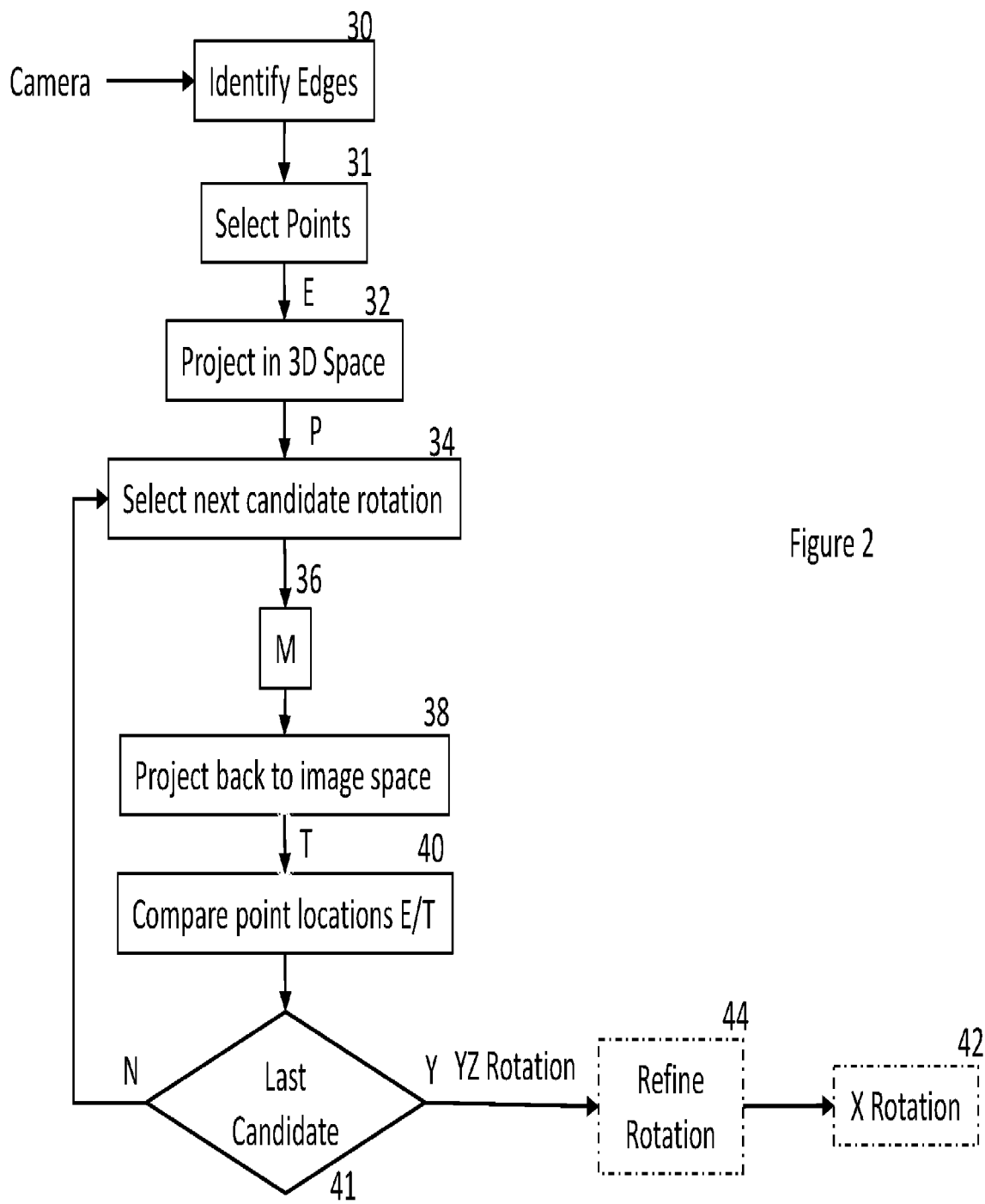
FIG. 2 is a flow diagram illustrating a method for calibrating a vehicle cabin camera according to an embodiment of the present invention.
Figure 3:
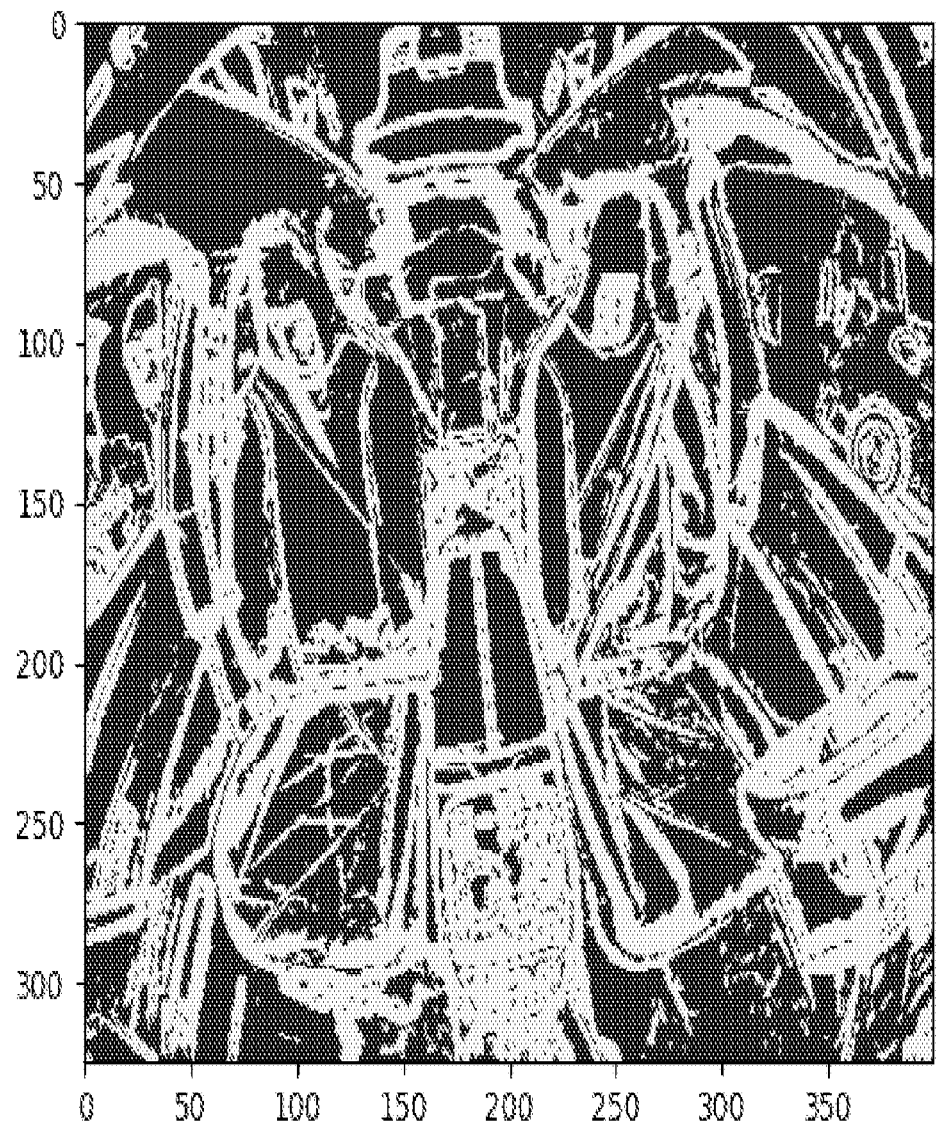
FIG. 3 illustrates edges identified in the image of FIG. 1.

Referring to FIG. 2, in a first step 30, a method for calibrating a vehicle cabin camera according to an embodiment of the present invention identifies the edges (or other features that can be easily compared) in an image acquired from a camera to be calibrated. FIG. 3 shows a typical set of edges derived from the image of the vehicle cabin shown in FIG. 1.

A set of image pixels E, lying on the identified edges, are then selected, step 31, and projected onto a unit sphere in 3D space using the cameras lens projection model, step 32.

Figure 4:
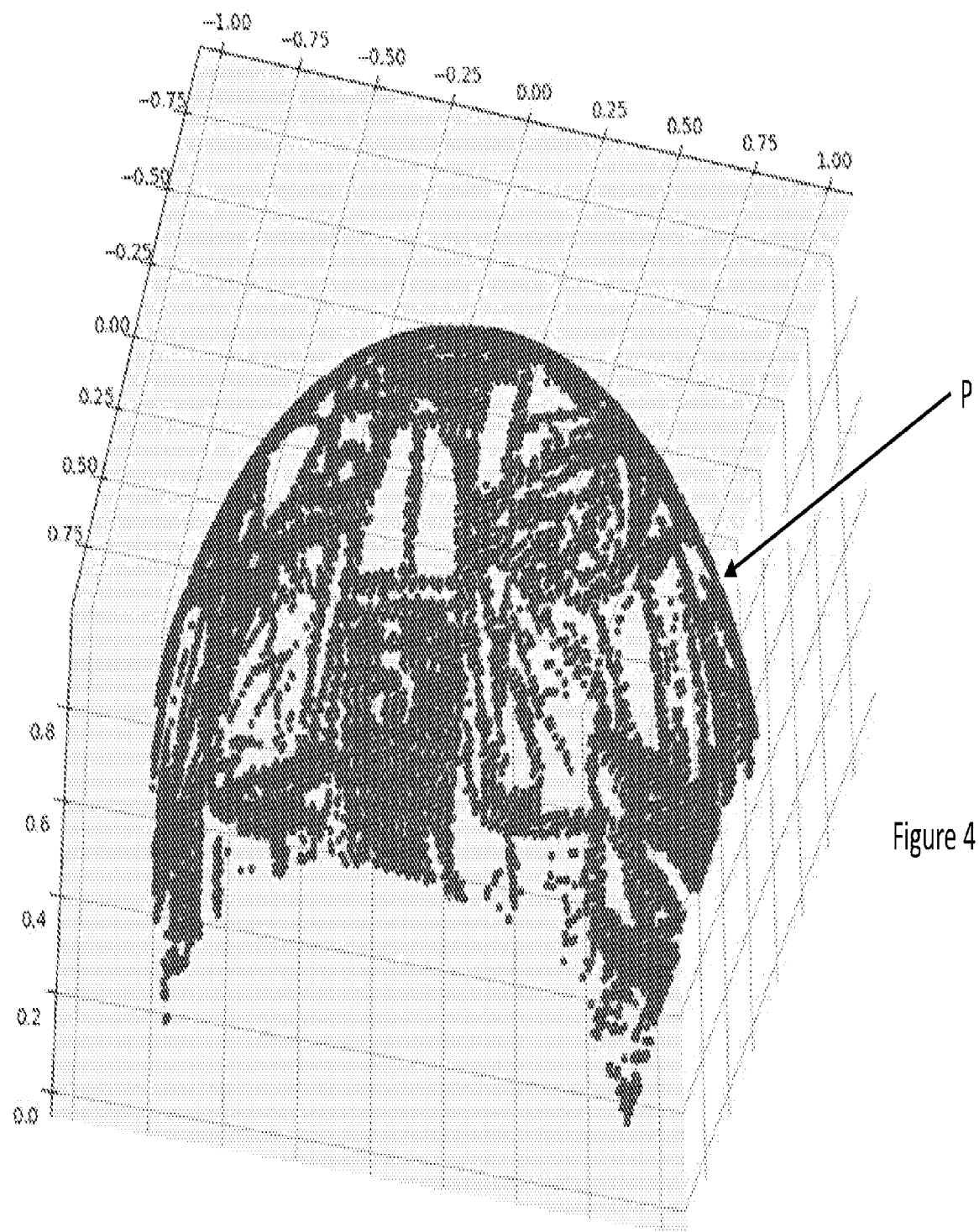
FIG. 4 illustrates the edge points of FIG. 2 transformed to a 3D space, some of which are aligned with the plane of symmetry of the vehicle.

Performing such a projection is described in WO2017/140438 (Ref: FN-495-PCT) and European Patent No. EP 3379202 (Ref: FN-609-EP), the disclosures of which are herein incorporated by reference. FIG. 4 shows the results of this projection for the selected set of pixels E from the edges shown in FIG. 3 and the set of projected 3D points can be denoted as P.

Note that the number of image points selected for the set of pixels E can be a function of available computing power. In the embodiment, points which lie on identified edges are chosen, because subsequent comparisons can then be independent of luminance or chrominance. However, where more computing power is available, greater numbers of pixels as well as possibly pixels which do not lie on edges can be chosen. In extreme cases, all pixels of the image could be used.

The method now attempts to find a rotation $R_{ZY}$ from a set of candidate rotations that will best align a plane of symmetry within the point cloud P with the YZ plane of the coordinate system. The complete set of candidate rotations comprises all potential Z rotations combined with all potential Y rotations, so comprising a set of Y*Z candidate rotations.

Theoretically, the method could exhaustively test all candidate rotations within the set of candidate rotations according to an objective function to find the best candidate rotation. Nonetheless, some intelligence can be provided to minimize the task of finding the best candidate rotation. For example, the method can begin with a number of spaced apart seed candidate rotations and seek a best candidate rotation starting from each of these candidate rotations. This helps to identify a best candidate rotation among what may be a number of local peaks for the objective function across the search space. One seed candidate chosen could comprise a Y,Z=0° with the next candidate rotations chosen comprising Y=±1°, Z=0° and Y=0°, Z=±1°, where I is an increment in degrees. Depending on which of the next candidate rotations improves most on the result provided from the first seed candidate and possibly taking into account the specific direction in which the results of the objective function appear to be improving, the next candidate rotation can be chosen. Another, seed candidate rotation chosen could correspond with the last calibrated rotation. Alternatively, or in addition, other seed candidate rotations could be selected from evenly distributed candidate rotations around the search space. Other methods for locating a best matching candidate rotation in the presence of a plurality of local peaks for the objective function within a search space include particle swarms or genetic algorithms. In any case, once a best local peak for a candidate rotation is discovered after an initial search, this can be chosen as a candidate global minimum and a refined search about the global minimum candidate rotation can then be performed to produce a final result for $R_{ZY}$.

For example, if a gradient derived from the objection function points from the candidate global minimum towards an optimal candidate rotation, then this can be followed to more directly arrive at the optimal candidate rotation to form the basis for calibration.

In any case, for a given candidate rotation selected at step 34, each point of the set of points P is rotated to the symmetry plane using the candidate rotation. The rotated points are then then mirrored or flipped through the YZ plane, before being rotated back towards their initial orientation using the inverse of the candidate rotation, step 36. This step 36 can be represented by a single transformation represented by a matrix M constructed as follows:

$$M = R_{YZ} S R_{YZ}^{-1}$$

where $R_{YZ}$ is the candidate rotation matrix that rotates the points P around Y and Z axes and S is a matrix that flips the X axis:

$$S = \begin{bmatrix} -1 & 0 & 0 \\ 0 & 1 & 0 \\ 0 & 0 & 1 \end{bmatrix}.$$

These transformed points are then projected back to the image space, step 38, using the inverse of the projection performed at step 32, to produce a transformed set of points T.

When the right rotation values for the Y and Z axes are found, the transformed set of points T will align maximally with the original set of points E, i.e. sum or sum of squares or any other function of the difference in locations between the edge points E and their corresponding transformed edge points T will be minimized. Note that no correspondence is known between any given point of the set of points E and the set of transformed points T and so the objective function employed needs to be based on a measure of the difference between the sets of points as a whole.

One suitable objective function involves calculating an image gradient for an acquired image frame and storing it in form of a gradient map. Note that this gradient map can comprise both gradient magnitude and gradient direction values. Pixels of the gradient map whose magnitude exceeds a certain threshold are selected as the set of points E (typically points with high gradient values lie on edges within the image), step 31, so it will be seen how using the threshold can increase or decrease the number of points within the set of points E. The selected points E are projected onto the unit sphere using the camera projection model, step 32, transformed with the matrix M described above, step 36, and then projected back to the image space, step 38 to generate a transformed gradient map T for a selected candidate rotation. It will be appreciated that for a perfectly symmetrical cabin interior, if an exact match candidate rotation $R_{ZY}$ is chosen, the points within the set of points E will be mirrored to produce a map of transformed points T with locations and gradients closely matching those of the set of points E. In practice, this is highly unlikely, nonetheless the differences between the values for one or more transformed map locations (interpolated, if needed) at or around each location corresponding to a selected gradient magnitude point from the set of points E is used to calculate the value of the objective function, step 40. For example, a sum of squared errors, robust norm, or other measure suitable for optimization can be used.

It will be appreciated from the above example, that using gradient values including magnitude and possibly direction can provide a better measure of difference between the set of points E and the transformed points T less sensitive to small differences in location between points E and T. Nonetheless, simple values of luminance, chrominance at each of the set of points E and corresponding values for one or more transformed point locations T closest to the points of the set of points E can also be used to calculated the value of the objective function.

Another suitable objective function, for providing a measure of a match between two sets of points such as the points E and T, is disclosed in K. Grauman and T. Darrell, "The Pyramid Match Kernel: Efficient Learning with Sets of Features", Journal of Machine Learning Research (JMLR), 8 (April): 725-760, 2007.

In any case, in step 40 a measure is taken of the difference between the set of points E and the transformed set of points T.

As mentioned, once all candidate rotations have been exhausted, the candidate rotation $R_{YZ}$ with the best match between the sets of points E and T is chosen as the candidate rotation to be used for calibrating the camera, step 41.

Depending on the resolution of the set of candidate rotations used to find the candidate rotation $R_{YZ}$, the result can be refined, by searching for an improved match within the vicinity of the selected candidate rotation, step 44.

In any case, the candidate rotation $R_{YZ}$ selected after steps 34-41 and possibly 44 comprises the Z and Y axis rotations for the camera relative to the plane of symmetry YZ of the vehicle.

As mentioned, the image acquired by the camera does not, in itself, contain sufficient information to be used to find the camera's rotation around the X axis. Some additional information is needed to determine this missing value. Two methods are disclosed below for determining the X rotation for calibrating the camera, step 42, these can generally be divided as follows:

Visual—using a priori knowledge of the 3D structure of the vehicle interior; or

Inertial—using an accelerometer incorporated with the camera or mirror.

The visual method requires a set of 3D points (X,Y,Z) coordinates corresponding to points on edges which are generally visible to the camera across its range of rotation. These edges are typically generated from the CAD design data of the vehicle cabin interior and then provided to either the camera vendor or the vendor of any downstream processing applications which need to calibrate the camera.

In theory, a set of annotated 3D coordinates for distinctive points or portions of visible edges from the CAD data should be sufficient to find full 3D pose of the camera. However, in practical applications, the reliability of this process is lowered due to various reasons including:

not all visible edges being represented in the CAD model, the position of movable objects like seats or steering wheel not being certain at the time of calibration, or people sitting in the car and their belongings intermittently occluding otherwise visible edges.

The reliability of a CAD based approach can therefore be increased if some of the degrees of freedom can be locked using the method of FIG. 2.

Another argument against using only CAD data to calibrate the camera is performance. When using 3D CAD data, at least three degrees of freedom must be found simultaneously. Since the objective function will most likely contain a lot of local minima, some sort of global optimization must be employed. This means that the complexity will be proportional to $n^3$ where n is the search density along one of the degrees of freedom. The method described in relation to FIG. 2 has a complexity proportional to $n^2$, so combining the symmetry-based method of FIG. 2 with a CAD-based method used to find only the orientation around the X axis offers a complexity of $n^2+n$ which is almost an order of magnitude lower than a pure CAD-based method of finding camera orientation.

In any case, using the visual method, the 3D points from the CAD model are rotated around the Y and Z axes first according to the candidate YZ rotation chosen using the method of FIG. 2, and then the X axis calibration is performed by rotating these 3D points around the X axis with a number of candidate X rotations. Again, a first candidate rotation can be chosen as a default value or the last calibrated value and the search for an optimal candidate can be guided as candidate rotations in each direction provide better or worse results.

Figure 5:
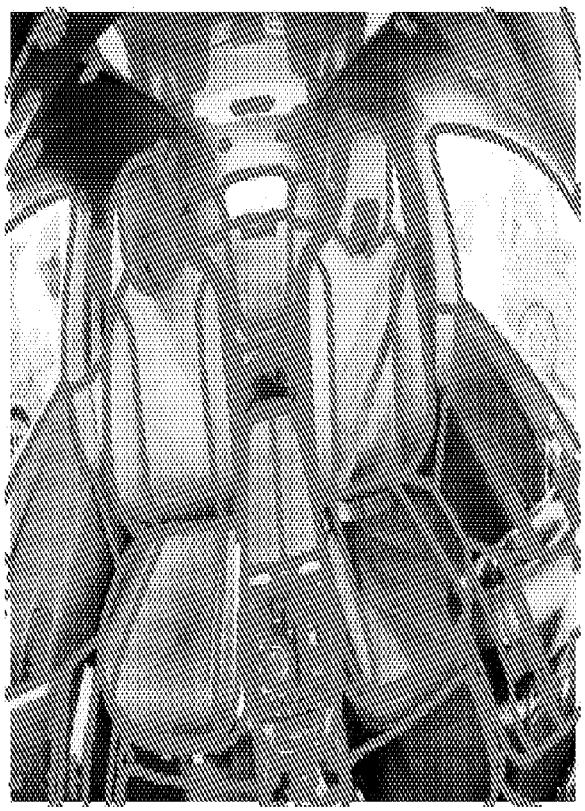
FIG. 5 CAD edges projected to the image properly oriented around the X axis.

In any case, for any given candidate X rotation, the points from the CAD model rotated through the optimal Y and Z rotations and the candidate X rotation are projected to the image space and compared to the corresponding edges detected in the acquired image, such as shown in FIG. 3. A poor candidate X orientation provides a set of edges which do not correlate well with the detected edges, whereas a good candidate will provide a higher degree of correlation. FIG. 5 shows a set of edges acquired from a CAD model which have been rotated according to an optimal YZ and X rotation. It will be seen that these correlate well with the original image features and so edges derived from those image features will tend to correlate well with the rotated CAD data.

In the example of FIG. 5 some of the CAD data chosen comprises edges of the front seats which it will be appreciated in many cases may be adjusted by vehicle occupants or occluded by vehicle occupants. As such it will be appreciated that data corresponding to such features may not be chosen for the data from the CAD model to be used in calibrating the camera.

Note that either after the method of FIG. 2 or after determining a given optimal X rotation from a limited set of X rotations, the chosen YZX rotation may be refined for example, using gradient descent optimization, to find a more exact camera orientation. Such an optimization tends to converge quickly as it should have been initialized at a position close to a global minimum.

In the simplest inertial method, the calibrated rotation around the X axis can be measured by calculating an angle α between the gravity vector (G), measured using an accelerometer incorporated within the camera or mirror, and the Y axis of the local camera coordinate system as shown in FIG. 6(a).

This method of alignment is known and used to electronically level the horizon in the cameras equipped with such function. However, this method does not allow for full camera orientation calibration. Rotation with one degree of freedom, around the gravity vector, is still undefined in this case.

Inertial based implementations of the present application combine the accelerometer measurement with the method of FIG. 2. The optimization dimensionality in this case is reduced to 1D making this method extremely efficient and not requiring any information about 3D structure of the vehicle interior. Only the angle of rotation around the gravity vector needs to be found with the method described in FIG. 2.

In real-life scenarios, however, measuring the acceleration due to gravity using only one accelerometer mounted inside the camera will not be sufficient as the vehicle may be on an incline or tilted as shown in FIG. 6(b). So, while the mirror camera accelerometer will show the global direction of the gravity vector, to properly calibrate the camera, a vector pointing vertically in the car coordinate space is required.

To compensate for the car orientation, a second accelerometer mounted inside the car and associated with its coordinate system is used (such accelerometers are typically employed and their measurements are commonly available in modern vehicles through the vehicle communication bus). Both accelerometers will show the same acceleration vector as seen from the world coordinate system point of view. The only difference between accelerometer measurements will be result of the camera misalignment with respect to the car coordinate system.

In FIG. 6(b), $Z_1$ and $Y_1$ represent axes of the camera coordinate frame while $Z_2$ and $Y_2$ represent car coordinate system. The gravity (acceleration) vectors $G_1$ and $G_2$ are physically the same but represented by different values by two accelerometers as it is measured in two different local coordinate systems. After aligning the axes of both coordinate systems, the difference between their relative orientation can be calculated by calculating a rotation of $G_1$ into the $G_2$ position, FIG. 6(c).

The rotation between the $G_1$ and $G_2$ vectors in the 3D space can be calculated using the Rodrigues' rotation formula or any other method. The resulting rotation (represented as a matrix, quaternion or other form) can be used to calculate orientation of the camera's Y axis in the car's coordinate frame and then the camera rotation around Y axis can be recovered to in turn allow the rotation around the X axis to be determined as indicated above.

Note that the inertial based approach to determine the rotation around the X axis can be performed before or after the method described in FIG. 2.

The invention claimed is:

1. A method for calibrating a vehicle cabin camera, said camera having: a pitch angle X around a vehicle transverse axis, a yaw angle Y around a vertical axis and a roll angle Z around a vehicle longitudinal axis; and a field of view capturing a plurality of vehicle cabin features which are symmetric about said vehicle longitudinal axis across a range of pitch, yaw and roll positions of said camera, said camera being incorporated within a vehicle rear view mirror, the method comprising:
   obtaining an acceleration measurement from an accelerometer incorporated within said camera or said vehicle rear view mirror;
   obtaining an acceleration measurement from an accelerometer incorporated in said vehicle outside of said vehicle rear view mirror;
   combining said acceleration measurements to determine a rotation $R_x$ around said transverse axis;
   selecting a set of points from within an image of the vehicle cabin acquired by said camera;
   projecting each of said points onto a 3D unit circle in accordance with a camera projection model;
   determining a rotation around the vertical axis and the vehicle longitudinal axis;
   computing rotation values for the vertical axis and the vehicle longitudinal axis based on the determined rotation; and
   transforming the selected set of points based on the rotation values.

2. The method of claim 1 further comprising:
   detecting a set of edges within said image of the vehicle cabin, and
   selecting said set of points from within edge locations.

3. The method of claim 1 further comprising performing calibration around said transverse axis by:
   obtaining one or more 3D vehicle coordinate space locations for respective distinctive cabin features visible across a range of pitch, yaw and roll positions of said camera;
   rotating said coordinate space locations according to the selected rotation;
   for each of one or more rotations $R_x$ of a set of candidate pitch rotations,
      further rotating the rotated 3D vehicle coordinate space locations with the rotation $R_x$; and
      mapping the further rotated locations into the image plane to provide a set of transformed locations; and
   selecting a candidate rotation $R_x$ which provides a best match between the set of transformed 3D vehicle coordinate space locations and the locations of corresponding distinctive cabin features in an image acquired by the camera.

4. The method of claim 1 wherein said steps for determining a rotation $R_x$ around said transverse axis are performed either: before said steps of claim 1 or after said steps of claim 1.

5. The method of claim 1 wherein said set of candidate yaw and roll rotations are spaced apart from one another at a first angular resolution and wherein said method further comprises finding an improved candidate yaw and roll rotation within said angular resolution of said selected candidate rotation.

6. The method of claim 1 comprising:
   generating a gradient map corresponding to said acquired image;
   selecting said set of points from points within said gradient map having a gradient greater than a threshold;

for each selected point from within said gradient map, comparing the gradient value for the selected point with respective gradient values of one or more points of said transformed point locations closest to said selected point to provide a difference; and aggregating said differences to obtain a measure of the match for a candidate rotation.

7. The method of claim 1 comprising calibrating at least one other camera incorporated within said vehicle rear view mirror using said camera calibration.

8. The method of claim 1 further comprising determining a location of said camera in 3D vehicle coordinate space according to said calibration and knowledge of a spatial relationship between said camera location and a ball joint mount for said rear view mirror.

9. A computer program product comprising a computer readable medium on which instructions are stored which when executed on a processor of a vehicle system are configured to perform a method of calibrating a vehicle cabin camera, said camera having: a pitch angle X around a vehicle transverse axis, a yaw angle Y around a vertical axis and a roll angle Z around a vehicle longitudinal axis; and a field of view capturing a plurality of vehicle cabin features which are symmetric about said vehicle longitudinal axis across a range of pitch, yaw and roll positions of said camera, said camera being incorporated within a vehicle rear view mirror, the method comprising:

obtaining an acceleration measurement from an accelerometer incorporated within said camera or said vehicle rear view mirror;

obtaining an acceleration measurement from an accelerometer incorporated in said vehicle outside of said vehicle rear view mirror;

combining said acceleration measurements to determine a rotation $R_x$ around said transverse axis;

selecting a set of points from within an image of the vehicle cabin acquired by said camera;

projecting each of said points onto a 3D unit circle in accordance with a camera projection model;

determining a rotation around the vertical axis and the vehicle longitudinal axis;

computing rotation values for the vertical axis and the vehicle longitudinal axis based on the determined rotation; and transforming the selected set of points based on the rotation values.

10. A system for calibrating a vehicle cabin camera, said camera having: a pitch angle X around a vehicle transverse axis, a yaw angle Y around a vertical axis and a roll angle Z around a vehicle longitudinal axis; and a field of view capturing a plurality of vehicle cabin features which are symmetric about said vehicle longitudinal axis across a range of pitch, yaw and roll positions of said camera, said camera being incorporated within a vehicle rear view mirror, the system comprising:

one or more memories;

one or more processors in communication with the one or more memories, the one or more processors configured to:

obtain an acceleration measurement from an accelerometer incorporated within said camera or said vehicle rear view mirror;

obtaining an acceleration measurement from an accelerometer incorporated in said vehicle outside of said vehicle rear view mirror;

combining said acceleration measurements to determine a rotation $R_x$ around said transverse axis;

select a set of points from within an image of the vehicle cabin acquired by said cabin camera;

project each of said points onto a 3D unit circle in accordance with a camera projection model;

determine a rotation around the vertical axis and the vehicle longitudinal axis;

compute rotation values for the vertical axis and the vehicle longitudinal axis based on the determined rotation; and transform the selected set of points based on the rotation values.

11. The system of claim 10, wherein the one or more processors are further configured to:

detect a set of edges within said image of the vehicle cabin, and select said set of points from within edge locations.

12. The system of claim 10, wherein the one or more processors are further configured to perform calibration around said transverse axis by:

obtaining one or more 3D vehicle coordinate space locations for respective distinctive cabin features visible across a range of pitch, yaw and roll positions of said camera;

rotating said coordinate space locations according to the selected rotation;

for each of one or more rotations $R_x$ of a set of candidate pitch rotations, further rotating the rotated 3D vehicle coordinate space locations with the rotation $R_x$; and mapping the further rotated locations into the image plane to provide a set of transformed locations; and selecting a candidate rotation $R_x$ which provides a best match between the set of transformed 3D vehicle coordinate space locations and the locations of corresponding distinctive cabin features in an image acquired by the camera.

13. The system of claim 10, wherein said set of candidate yaw and roll rotations are spaced apart from one another at a first angular resolution and wherein said method further comprises finding an improved candidate yaw and roll rotation within said angular resolution of said selected candidate rotation.

14. The system of claim 10, wherein the one or more processors are further configured to:

generate a gradient map corresponding to said acquired image;

select said set of points from points within said gradient map having a gradient greater than a threshold;

for each selected point from within said gradient map, compare the gradient value for the selected point with respective gradient values of one or more points of said transformed point locations closest to said selected point to provide a difference; and aggregate said differences to obtain a measure of the match for a candidate rotation.

15. The system of claim 10, wherein the one or more processors are further configured to calibrate at least one other camera incorporated within said vehicle rear view mirror using said camera calibration.

16. The system of claim 10, wherein the one or more processors are further configured to determine a location of said camera in 3D vehicle coordinate space according to said calibration and knowledge of a spatial relationship between said camera location and a ball joint mount for said rear view mirror.

* * * * *